United States Patent Office 3,180,563
Patented Apr. 27, 1965

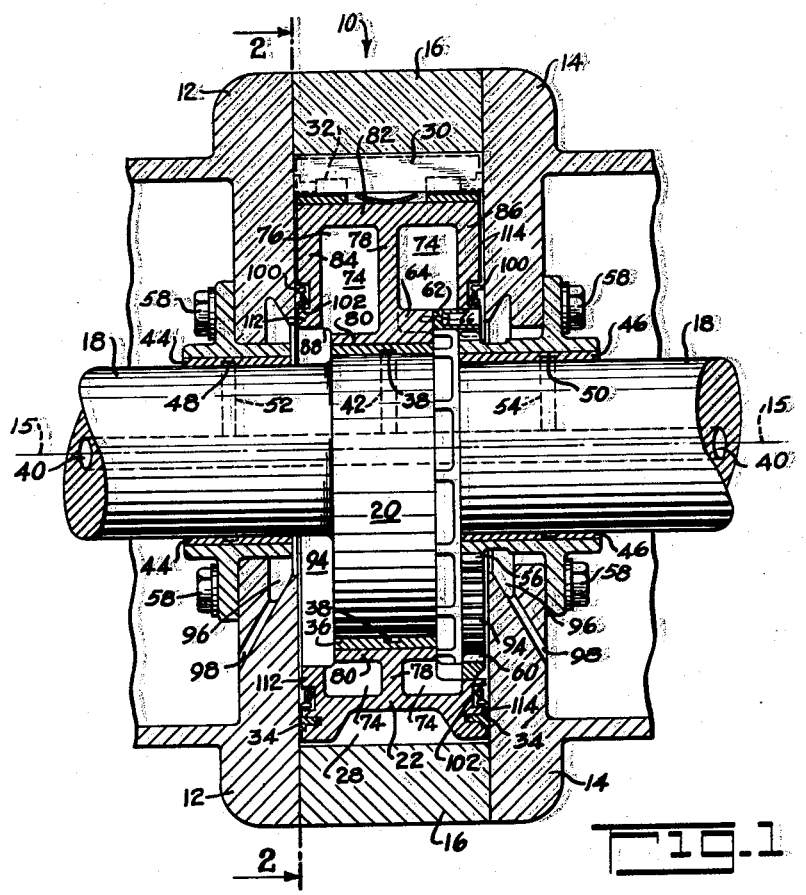

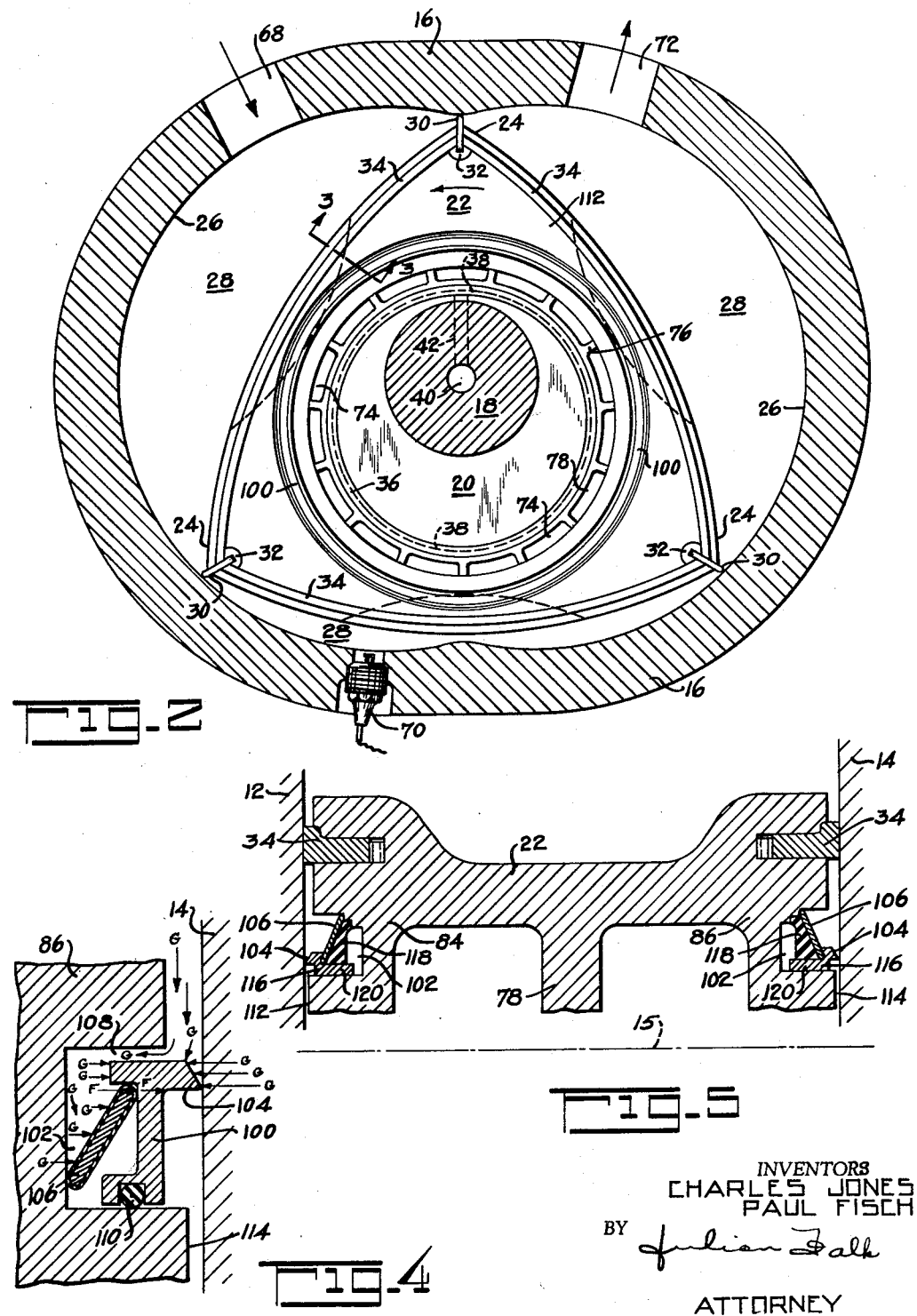

1

3,180,563
OIL SEAL CONSTRUCTION FOR ROTARY
COMBUSTION ENGINE
Charles Jones, Paramus, N.J., and Paul Fisch, New York, N.Y., assignors to Curtiss-Wright Corporation, a corporation of Delaware
Filed May 13, 1963, Ser. No. 279,804
6 Claims. (Cl. 230—145)

This invention relates to rotary combustion engines and in particular to a novel and improved oil seal for such engines. Although the invention is particularly applicable to rotary combustion engines and will be herein described in relation thereto, it should also be understood that the invention may be used with other types of rotary mechanisms or in other mechanisms where an effective means is required for sealing against oil leakage. A rotary combustion engine of the type described herein is clearly disclosed in United States Patent 2,988,065 issued to Felix Wankel et al.

In general, engines of this type comprise an outer body formed by a peripheral wall interconnected by a pair of parallel end walls thereby defining a cavity whose peripheral shape preferably is basically an epitrochoid. A rotatably mounted rotor is supported on a shaft within the cavity, the outer surface of which defines a plurality of circumferentially-spaced apex portions having radially movable seal strips mounted therein for sealing engagement with the inner surface of the peripheral wall thereby forming working chambers which upon relative rotation of the outer body and rotor vary in volume. An intake port is provided for admitting air or a fuel-air mixture to the combustion zone of said engine, an exhaust port is provided for expelling the burnt gases from said engine and an ignition means may be provided for igniting the fuel-air mixture whereupon the stages of intake, compression, expansion and exhaust may be carried out. Of course, it should be understood that the ignition means is intended to include ignition as in the diesel cycle, as the of the type described above which may be operated as a invention contemplates use in a rotary combustion engine diesel engine.

A lubrication system is provided for lubricating the engine shaft and bearings and includes means for supplying lubricating oil to the interior of the rotor for cooling purposes. As is well known in internal combustion engines, it is desirable to prevent the lubricating oil from leaking into the zone of the engine where combustion gases are present in order to minimize the oil consumption. It is equally important to prevent the combustion gases from leaking into the crankcase or oil reservoir as this will also lead to contamination of the oil as well as loss of compression.

It is generally the practice in piston-type internal combustion engines to provide an oil seal ring around the lower end of each piston. In rotary combustion engines of the type described herein the oil seal ring is mounted in the rotor and walls for sealing contact with the inner faces of the end walls of the engine housing. The rotor traces an epitrochoid path during its rotation and is also subject to slight axial movements relative to the housing end walls and, since the oil seals are mounted in the rotor, the oil seals must be capable of axial movement relative to the rotor for maintaining sealing contact with the housing end walls while tracing an epitrochoid path with the rotor. It has also been found that some gases will leak from the working chamber and flow between the rotor and the housing end walls and exert pressure on the oil seals tending to twist or pivot said oil seals in their grooves thereby moving the sealing surface of the seal member out of contact with the housing end walls, resulting in leakage of oil past the seal rings.

It is a primary purpose of the present invention to provide a novel and improved oil seal means which is pressure balanced for minimizing twisting or pivoting of the seal ring in its groove and which seal ring is maintaned in scraping sealing contact with the housing end walls by a spring force. The invention is generally carried out by providing a seal ring having substantially edge contact with the inner face of the adjacent housing end wall with said seal ring being biased into contact with said end wall by a Belleville-type spring. The spring and seal ring are in cooperating engagement such that the axial spring force component from said spring acts on a line through the contact region of the seal member in order to minimize any bending or twisting the seal ring out of contact with the end wall or in other words to prevent the contacting edge of the seal member from turning away from its contact region with said end wall.

Preferably the oil seal ring and its spring are arranged to permit gas pressure, which may leak from the working chambers to the region of the oil seal, to flow into the oil seal groove behind the seal member so that the gas pressure acting in an axial direction on the outer seal surface of the seal ring is opposed by the gas pressure acting on the back side of the seal ring and these opposing pressures preferably are substantially in balance. By this construction the contacting sealing edge of the seal ring is kept in firm sealing contact with the associated sealing surface on the housing end wall and the seal contact pressure is substantially unaffected by gas pressure forces or other forces tending to force the seal member out of sealing contact. As a result oil leakage past the oil seal is minimized and oil consumption is kept at a minimum.

Accordingly it is one object of the invention to provide a novel and improved oil seal construction for a rotary combustion engine.

It is another object of the invention to provide a novel and improved pressure balanced oil seal construction for a rotary combustion engine.

It is a further object of the invention to provide a novel and improved oil seal construction for a rotary combustion engine wherein the seal ring is urged into sealing edge contact by a force acting through the line of contact of said seal ring and its associated sealing surface.

It is an additional object of the invention to provide a novel and improved oil seal construction for a rotary combustion engine wherein means are provided for maintaining substantially constant sealing contact between the seal member and its associated sealing surface.

Other ompects and advantages of the invention will become apparent upon reading the following detailed description with the accompanying drawing wherein:

FIG. 1 is a sectional view of a rotary combustion engine embodying the invention;

FIG. 2 is a sectional view taken along line 2—2 of FIG. 1;

FIG. 3 is an enlarged sectional view of a portion of the rotary combustion engine taken along line 3—3 of FIG. 2;

FIG. 4 is an enlarged sectional view of the oil seal construction of FIG. 3 and diagrammatically illustrating the forces acting therein; and FIG. 5 is a view similar to FIG. 3 illustrating another embodiment of the invention.

In FIGS. 1 and 2 there is shown a rotary combustion engine having an outer body or housing generally designated at 10 composed of a pair of end walls 12 and 14 interconnected by a peripheral wall 16 forming a cavity therein having an axis 15. As shown, for example in FIG. 2 the profile of the inner surface of the outer body peripheral wall 16 preferably is basically a two-lobed epitrochoid. A hollow shaft 18 is rotatably mounted co-axial with the cavity and has an eccentric portion 20 formed thereon upon which is rotatably mounted a rotor 22 having three circumferentially spaced apex portions 24, as shown in FIG. 2 which apex portions 24 are in sealing cooperation with the inner surface 26 of the outer body 10 to form a plurality of working chambers 28 which upon relative rotation of the outer body 10 and rotor 22 vary in volume. Seal strips 30 are mounted partly in grooves provided in each apex portion and partly in intermediate seal bodies 32 mounted in said grooves and extend from one end face of the rotor to the other end face for continuous sealing engagement with the inner surface 26 of the peripheral wall 16 and thereby sealing the working chambers 28. End face seals 34 are also provided in each end face of the rotor and are in sealing cooperation with seals 30 and 32 to prevent leakage of the gases from the working chambers 28 in the regions between the end faces of the rotor and the housing end walls. A suitable bearing 36 is supported in the rotor 22 for rotatively supporting the rotor on the eccentric 20. An annulus 38 is cut out from the inner contour of the bearing 36 and communicates with an oil supply passage 40 in the shaft 18 through an oil passage 42 for supplying oil to the contacting surfaces of the bearing and eccentric. The oil supply passage 40 in shaft 18 is suitably connected to an oil pump (not shown), in a well known manner, for supplying oil under pressure to said oil supply passage 40. Suitable bearings 44 and 46 are also mounted in the end walls 12 and 14 as shown in FIG. 1, for supporting the rotating shaft 18 in the outer body end walls 12 and 14 with said bearings 44 and 46 each being provided with an annulus 48 and 50, respectively, in its bearing liner and communicating with oil passages 52 and 54 from the oil supply passage 40.

An externally-toothed gear 56 surrounds one of the shaft bearings, for example, the bearing 46, and is secured to the outer body end wall 14 by bolts 58. The gear 56 is disposed in meshing engagement with an internally-toothed gear 60 mounted on the rotor 22 adjacent an end face of the rotor. The internal gear 60 has a plurality of circumferentially-spaced bosses 62 formed thereon which abut corresponding bosses 64 on the interior of the rotor and screws 66 passing through the bosses 62 are threaded into the bosses 64 serve to secure the gear 62 to the rotor. The gears 56 and 60 serve to help rotatively position the rotor with respect to the epitrochoidal surface of the peripheral wall 16. In the embodiment illustrated having a two-lobed epitrochoid and a three lobed rotor, the ratio of rotation of the shaft eccentric with respect to the rotor is 3:1 wherein for each rotation of the rotor about its axis the eccentric rotates three times around the axis of its shaft.

An intake port 68 (see FIG. 2) is provided in the peripheral wall 16 for admitting air and/or a fuel-air mixture, an ignition means 70 may be provided for igniting the mixture and an exhaust port 72 is provided in peripheral wall 16 for expelling the burnt gases so that the stages of intake, compression, expansion and exhaust may be carried out.

The rotor 22 may be made hollow and has a plurality of circumferentially-spaced compartments 74 separated by webs 76, said compartments extending over the entire rotor interior. The compartments 74 are preferably further divided by an annular web 78 disposed transverse to the rotor axis and extending from the rotor hub portion 80 to the peripheral wall 82 of the rotor. As shown in FIG. 1, the rotor hub portion 80 terminates short of the rotor end walls 84 and 86 and also on the gear side short of the gear member 60 so that an annular gap 88 is formed at each end of the rotor hub portion for allowing a coolant to flow in and out of the compartments 74. During rotation of the shaft 18 with its eccentric 20, the bearings 36, 44 and 46 will become periodically unloaded and the oil will flow between the bearings and the shaft and some of this oil will collect in an annular cavity region between the end walls 12 and 14 and the rotor hub 80 designated at 94. Thus, it will be seen that lubricating oil is provided to the engine for lubricating the bearing surfaces and for cooling the interior of the rotor. Reference may be made to co-pending application Serial No. 206,753 entitled "Cooling System for a Rotary Mechanism" filed on July 2, 1962, and invented by Max Bentele, Charles Jones and Alexander H. Raye, for a more detailed description of the oil circulation for lubricating and cooling, which in itself forms no part of the present invention.

It will be apparent that, during operation of the engine, a substantial quantity of oil will collect in the annular cavity region 94 on each side of the rotor between the rotor end faces and the adjacent outer body end walls 12 and 14. In order to prevent the oil from passing between the rotor end walls 84 and 86 and the respective adjacent inner faces of the housing end walls 12 and 14 and out into the working chambers 32 where the oil may mix with gases for combustion, oil seal means are provided with said oil seal means generally comprising an annular oil seal member or ring 100 which is preferably made of iron and is mounted in an annular groove 102 in each of the rotor end faces 84 and 86 and positioned radially inwardly with respect to the rotor end face seals 34.

In the past such oil seals generally comprised seal members of resilient material such as rubber-like material or metal seal members with springs for biasing said seal members into sealing engagement or metallic seal members having inherent spring characteristics. It has been found, however, that these seal members of rubber-like material in some cases became plastically deformed while the metal seals were at times subject to twisting or pivoting in their seal grooves which caused a loss of sealing contact between the inner faces of the housing end walls 12 and 14 and the seal members. It has been further found particularly with rotary engines having a peripheral intake port, as illustrated, that with certain prior oil seal constructions the seal members are affected by gas pressure from the working chambers which by-passed the end face seals and escaped into the region between the rotor end walls and housing end walls. This gas pressure would act on the seal members to unbalance the forces thereon and cause said seal members to pivot and deflect away from their contacting engagement with the inner face of the housing end walls which would result in permitting oil to leak past the oil seal. It will be apparent from the following description that the present invention eliminates these defects in the prior art devices.

Referring now to FIGS. 3 and 4, each oil seal ring 100 is illustrated as being positioned in its seal groove 102 which is co-axial with the rotor axis and is disposed adjacent to the rotor hub. The seal member 100 preferably has a sloping seal face 104 for providing a scraping edge contact with the housing end walls 12 and 14 with said edge being the radially inner edge of said sloping seal face 104. With this construction the oil will be effectively scraped downwardly or radially inwardly by the seal member 100 whereby oil leakage radially outwardly past the seal member 100 is minimized. A conical annular metallic ring or Belleville-type spring 106 is positioned between each seal ring 100 and the bottom of its seal groove 102. The Belleville spring 106 has a force component against its seal ring 100 which is directed substantially parallel to the engine axis, as illustrated in FIG. 4 by the arrows designated F, and the spring 106 is positioned with respect to the seal ring 100 such that the axial force F is on a line passing through the contacting edge of the seal face 104 and the inner face of the housing end wall. As will be apparent, the spring 106 will urge the seal member 100 into sealing contacting engagement with its adjacent housing end wall and since the axial spring force F passes through the line of contact of the seal member and the housing end wall, any turning moments or coupling forces resulting from said spring force and tending to twist or pivot the oil seal ring in its groove are eliminated. It should be understood that, the contacting edge of the seal member is a slightly flattened surface and during the running life of the engine this surface may become slightly more flattened. However, the spring force acts substantially through the center of the region of contact of the seal member even after substantial wear of said seal member.

The use of the Belleville-type spring 106 in cooperation with the seal element 100 of the present invention has been found to be particularly advantageous. Firstly, the components of the spring force and their direction can be readily determined. Therefore, when using this type of spring, the biasing force for maintaining the seal member 100 in sealing contact can be accurately oriented with respect to the seal contact region of the seal ring 100 so that said biasing force will not produce any coupling forces on the seal member which would result in turning of the seal member in its groove and affect its sealing efficiency.

Secondly, a Belleville-type spring effectively utilizes a relatively higher percentage of the volume of spring material for doing spring work than other forms of springs such as coil or wave springs. Thus, the tension-compression characteristics around the annular Belleville-type spring member during deflection of the spring are such that a relatively large percentage of the spring material can operate at the stress limit which therefore makes it possible to get more effective work per unit volume of spring material. It has been found that the effective utilization of the spring material in a Belleville-type spring is slightly higher than a coil-type spring and substantially higher than a wave-type spring. A particular advantage of the relatively high effective utilization of spring material in a Belleville-type spring in the present invention lies in the fact that, design limitations require a maximum effective utilization of spring material for use in a minimum area. It is required that the oil seal grooves 102 in the rotor end faces be kept as small as possible so that the structural characteristics of the rotor are not disturbed and because there is a minimum area in said rotor end faces for locating the oil seal groove, particularly on the gear side of the rotor. Although a coil spring approaches the desired effective utilization of volume of spring material for doing spring work, the overall size of the coil spring or the number of such springs which must be used for obtaining the required spring action for maintaining sealing contact between the seal member and the housing end walls is such as to make its use prohibitive in the limited area of the oil seal groove. Therefore, with the design limitations on the size of the oil seal groove in the rotor end walls, it is possible with a Belleville-type spring to use a relatively smaller spring member for obtaining a maximum effective utilization of volume of spring material within the limited area of the oil seal groove, as compared to the effective utilization of spring material and relative size of coil-type or wave-type springs.

A third advantage of a Bellville-type spring in the present invention lies in the force-deflection characteristics of this type of spring. For a given volume of spring material, a Belleville-type spring has a relatively large spring deflection per unit of spring force. This means that, during slight axial motion of the rotor relative to the housing during engine operation, there will be relatively little variation in the contact force of the seal member against the housing end wall. From the above discussion it will be apparent that, with the particular requirements of the present invention, advantages are obtained by the use of a Belleville-type spring which cannot be obtained with the application of coil-type or wave-type springs.

Means are further provided for gas pressure balancing the oil seal ring 100 in its groove 102. Referring to FIG. 4, it can be seen that the seal groove 102 has a slightly larger radial height than the seal ring 100 providing a slight clearance 108 therebetween. During engine operating some of the gases from the working chambers 32 may leak past the end face seals 34 between the rotor end walls and the housing end walls and exert pressure on the oil seal rings 100. If the oil seal structure were such that this gas pressure were prevented from flowing into the seal groove and behind the seal member, then the gas pressure would act only on the sealing contact side of the seal member and would cause an unbalance of the gas pressure forces on the seal member. Any such unbalance of gas pressure forces on the oil seal ring might result in deflection of the seal ring which might force the seal member out of sealing contact with the inner face of the adjacent housing end wall with resulting leakage of oil past the seal member.

With the oil seal construction illustrated, any gas pressure between the gas seals 34 and the oil seal ring 100 at a rotor end face not only acts on the seal face 104 to urge the seal ring axially into its groove 102 away from the adjacent housing end wall but this gas pressure can also flow through the clearance 108 into the seal groove 102 behind the seal ring 100, as illustrated by arrows G in FIG. 4, this latter gas pressure urging the seal ring 100 axially outwardly toward the adjacent housing end wall. As illustrated in FIG. 4 the forces from the gas pressure acting upon a seal ring 100 will act on substantially equal areas on both sides of the seal member in opposition to one another and will therefore substantially cancel each other out. The gas pressure which is also acting on the Belleville spring does not cause an increase in the axial force urging the oil seal ring toward the adjacent housing end wall providing contact is not lost between spring 106 and groove 102, and the spring load and dimensions are always selected so that this cannot occur. Therefore, with respect to the forces due to gas pressure, the oil seal ring 100 will be substantially balanced and no deflection will result from the gas pressure forces.

This construction is particularly advantageous in a rotary combustion engine having its intake port located in the peripheral wall, as illustrated in FIG. 2. In this case the gas pressure, which may enter the area adjacent the oil seal groove 102, may become relatively high due to the compression and combustion of the gases in the working chambers and the gas pressure may have a critical effect on the action of the oil seal member 100. The problem is not as critical, however, in an engine having the intake port located in one of the end walls since, in this case, the region between the side face seals 34 and the oil seal member 100 periodically becomes exposed to the intake port wherein the pressure is substantially equal to atmospheric pressure. Thus, the pressure in this region will be periodically reduced and relieve the pressure from the gases acting on the oil seal member 100. A rotary combustion engine utilizing an intake port in one of the end walls may be seen in United States Patent 3,033,180, issued on May 8, 1962, to Max Bentele.

With further reference to FIGS. 3 and 4, a separate resilient seal member 110 which as illustrated, may be an O ring seal of rubber-like material is preferably provided between the seal ring 100 and the bottom portion or radially inward wall of the seal groove 102. The seal member 110 serves to prevent oil from leaking between the bottom portion of the seal ring 100 and the adjacent wall of the seal groove 102. The rubber seal member 110 may also be located between the seal groove and the radially outward portion of the seal member 106 for providing the same function but then the aforementioned balancing of the gas pressure forces is no longer provided. The Belleville spring 106 may also be coated with an elastic material 111 such as rubber (FIG. 4) to provide further sealing within the seal groove 102 to seal against any oil which may leak past the seal member 110. However, when spring 106 is coated, the seal member 110 may be eliminated since the coating on the spring 106 functions in the same manner as the seal member 110. Drain passages (not shown) may also be provided in each oil seal groove 102 to drain any oil present in said grooves into the interior compartments 74 of the rotor.

As also illustrated in FIGS. 1–4, the rotor end walls 84 and 86 may have portions with a larger width radially inwardly of the oil seal grooves 102 than the width of said rotor end walls radially outwardly of said oil seal grooves 102, said portions being designated at 112 and 114, to provide less clearance between these portions of the rotor end walls and the housing end walls than between the rotor end walls and housing end walls radially outwardly of the oil seal grooves 102. The reduction in clearance at the portions 112 and 114 serves to limit axial motion of the rotor 22 relative to the housing end walls 12 and 14 and further provides for an initial rough seal for limiting the amount of oil that can flow between the rotor end walls 84 and 86. Thus, the sealing requirement of the seal members 100 and 110 is reduced and will add to the running life of these members as well as reducing the possibility of oil leakage past said seal members. Since the portions 112 and 114 and the adjacent portion of the housing end walls 12 and 14 will be substantially constantly wetted by oil from the cavity 94, these portions will be well lubricated to provide an axial thrust bearing between the rotor and housing end walls. For greater details of this rotor end wall construction, reference may be made to copending application entitled "Rotor and Seal Construction for Rotary Mechanisms" invented by Charles Jones.

In FIG. 5 there is shown another embodiment of the invention with like elements having like numerals. As shown therein, the rotor 22 is provided with oil seal grooves 102 having oil seal rings 116, which are also preferably iron, positioned adjacent the bottom portions or radially inward portions of said seal grooves 102. The oil seal rings 116 have sloping seal faces 104 similar to those of seal members 100 for scraping contact with the inner faces of the housing end walls 12 and 14, respectively. Each oil seal ring 116 is biased into sealing contact with the inner face of the housing end wall adjacent to it by a Belleville spring 106 which, as in the case of the embodiment described above, has an axial force component which passes through the center of contact between the seal member 116 and the inner face of the adjacent housing end wall. In this embodiment, however, the spring 106 has a molded ring 118 of elastic material, such as rubber, bonded thereto, which ring 118 when in a compressed position, as illustrated in FIG. 5, seals against the rotor and the seal member 116. Obviously, the Belleville spring 106 in FIGS. 3 and 4 may likewise have a molded rubber ring 118 bonded thereto in lieu of the rubber seal 110 or the coated spring member 106.

The ring 118 is deliberately formed so that, previous to assembly in the seal groove 102, said ring 118 has a larger height than the Belleville-type spring 106 to which said ring 118 is bonded. Before assembly into the seal groove, the oil seal ring 116 is squeezed against the compressible ring member 118 so that the two-piece construction of the oil seal ring 116 and the spring 106-ring 118 combination can be handled as if it were a one-piece construction. This is advantageous for reducing the possibility of incorrect assembly by the mechanic during assembly or replacement of the oil seal construction. Another advantage of the seal construction of this embodiment lies in the combination of the sealing properties of the elastic material of ring 118 with the spring properties of the metallic Belleville spring 106 into a one-piece construction. In some previous seal constructions rubber rings were relied upon to not only seal but to act as a spring for biasing the seal member into sealing contact. Eventually, however, these rubber rings lose their resiliency which reduces their spring and sealing characteristics. It will also be apparent that the use of a separate metallic spring does not overcome this problem since the spring by itself does not have adequate sealing characteristics. The one-piece elastic member and spring construction of the present invention combines the resiliency and sealing characteristics of each of these members into a unit wherein these characteristics can be utilized to overcome the problem faced when using these elements separately. Since the ring 118 only seals against cylindrical portion 120 of the oil seal ring 116 and because of the compressibility of the elastic material of the ring 118 the oil seal ring 116 may move axially within the seal groove 102 to adjust to the end housing without losing sealing contact with the ring 118. Thus, the ring member 118 will seal against oil leakage around the oil seal ring 116 and outward into the working chambers 32 and the Belleville spring 106 will keep the oil seal ring 116 in sealing contact while eliminating turning of the oil seal ring 116 in its groove 102. However, the seal construction of the embodiment of FIG. 5 is not pressure balanced as in the case of the seal construction illustrated in FIGS. 1–4. It should be understood however, that means may be provided for pressure balancing the oil seal ring 116 in its groove as in the case of the seal member 100.

From the above description it will be apparent that a novel and improved oil seal construction is provided in which the oil seal is kept in substantially constant sealing contact for preventing any oil leakage past said oil seal. The preferred embodiment of the invention substantially eliminates adverse forces which may act on the oil seal to cause it to lose its sealing contact through a novel cooperation of a spring and seal member construction and provision for balancing the gas pressure forces acting on the seal member.

While the invention has been specifically set forth in detail in its preferred form in the above description, it should be understood that it is intended that the invention is not to be so limited thereby and it will be obvious to those skilled in the art that various changes and modifications may be made without departing from the spirit and scope of the invention. We intend to cover all such modifications in the appended claims.

We claim:

1. A rotor and oil seal construction for a rotary mechanism having an outer body including a peripheral wall interconnected with a pair of end walls forming a cavity; a shaft rotatably supported in said outer body and having an eccentric portion thereon located in said cavity; a rotor rotatably journaled on said eccentric portion with said rotor including a peripheral wall interconnected with a pair of end walls, said rotor peripheral wall having a plurality of circumferentially-spaced portions for continuous sealing cooperation with the inner surface of said outer body pheripheral wall to define working chambers between the outer body and said rotor which upon relative rotation of said outer body and said rotor vary in volume; means for supplying oil to said rotatable shaft for lubrication of said shaft during rotation thereof; said rotor and oil seal construction comprising axially movable oil seal ring means carried by each end wall of said rotor and including seal engaging faces the profile of which provides a substantially edge contact sealing surface for sealing cooperation with said outer body end walls for minimizing oil flow radially outwardly between the rotor end walls and the outer body end walls; and metallic Belleville-type spring means for axially urging said oil seal ring means into sealing engagement with said outer body end walls and said metallic Belleville-type spring means directly engaging an associated end wall of said rotor and a region behind its associated oil seal ring means with the region of engagement between said metallic Belleville-type spring means and said oil seal ring means being so located that the axial force of said metallic Belleville-type spring means passes through the substantially edge contact sealing surface of said oil seal ring means.

2. A rotor and oil seal construction as recited in claim 1 wherein said oil seal ring means are mounted in a seal groove in each rotor end wall; and an elastic seal member positioned in said seal groove and cooperatively engaging each oil seal ring means and its associated seal groove so that oil will be prevented from entering said seal groove and flowing around the oil seal member and into said working chambers.

3. A rotor and oil seal construction as recited in claim 1 wherein said Belleville-type spring means includes a coating of elastic material to provide sealing between the mating surfaces of said Belleville-type spring, said seal groove and said oil seal ring means so that oil is prevented from flowing around oil seal ring means and into said working chambers.

4. A rotor and oil seal construction as recited in claim 1 wherein each said oil seal ring means is mounted in a seal groove having slightly larger dimensions than its associated oil seal ring means; and said Belleville-type spring means including an elastic ring molded thereto for providing sealing contact between said seal groove and said oil seal ring means for preventing oil from flowing around said oil seal member and into said working chambers.

5. A rotor and oil seal construction as recited in claim 1 wherein said rotor has a greater width radially inward of said oil seal means than the width of said rotor radially outward of said oil means so that the flow of oil radially outward toward said oil seal means between said rotor end walls and said outer body end walls is limited.

6. A rotor and oil seal construction as recited in claim 1 wherein said seal engaging face of each of said oil seal ring means diverges from said substantially edge contact surface in a radially outward direction to leave a space between the contacting portion of said seal engaging face with the outer body end wall and the radially outward wall of said oil seal ring so that gas pressure from the working chamber may act on the diverging portion of said seal engaging face, said oil seal ring means being mounted in a groove in each rotor end wall with the groove having larger dimensions than its associated oil seal ring so that gas pressure from the working chambers may enter said groove and act behind said oil seal ring and the area behind said oil seal ring and the area of said diverging portion of said seal engaging face upon which said gas pressure may act being substantially equal so that the gas pressure acting on said oil seal ring means will be balanced.

References Cited by the Examiner
UNITED STATES PATENTS

| 2,352,784 | 7/44 | Geyer | 277—90 |
| 2,868,562 | 1/59 | Heimbuch | 277—38 |
| 2,979,042 | 4/61 | Bentele | 123—8 |
| 2,985,475 | 5/61 | Peickii et al. | 277—38 |

FOREIGN PATENTS

| 599,170 | 5/60 | Canada. |

LAURENCE V. EFNER, *Primary Examiner.*

ROBERT M. WALKER, *Examiner.*